Jan. 27, 1925.　　　　　　　　　　　　　　　　1,524,128
G. E. GRIMM
SEAT STRUCTURE
Filed Sept. 7, 1920　　　　3 Sheets-Sheet 2
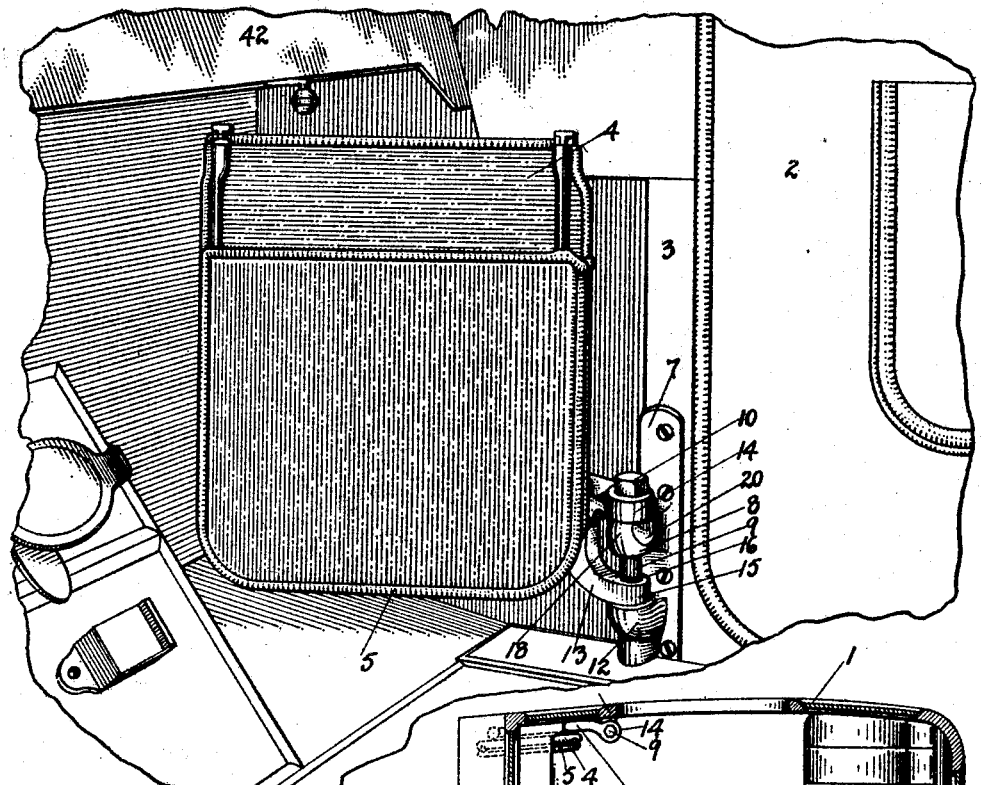
Fig. III
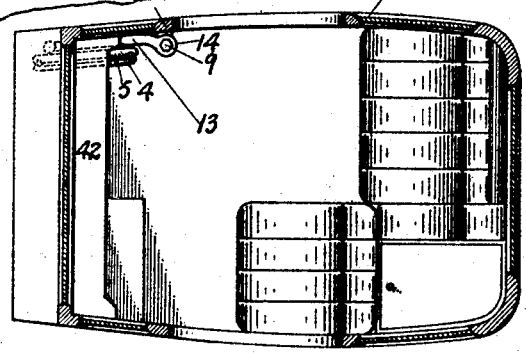
Fig. IV
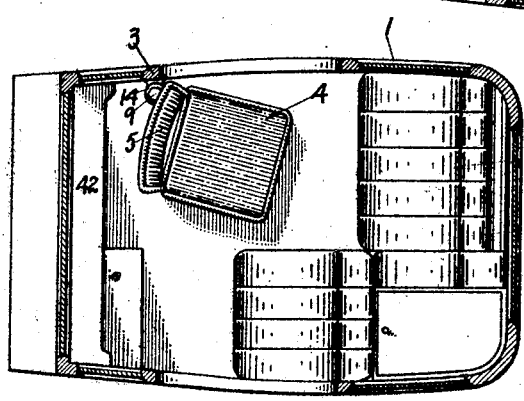
Fig. V
INVENTOR.
George E. Grimm
BY Chester H. Braselton
Harry W. Lindsey Jr.
ATTORNEYS.

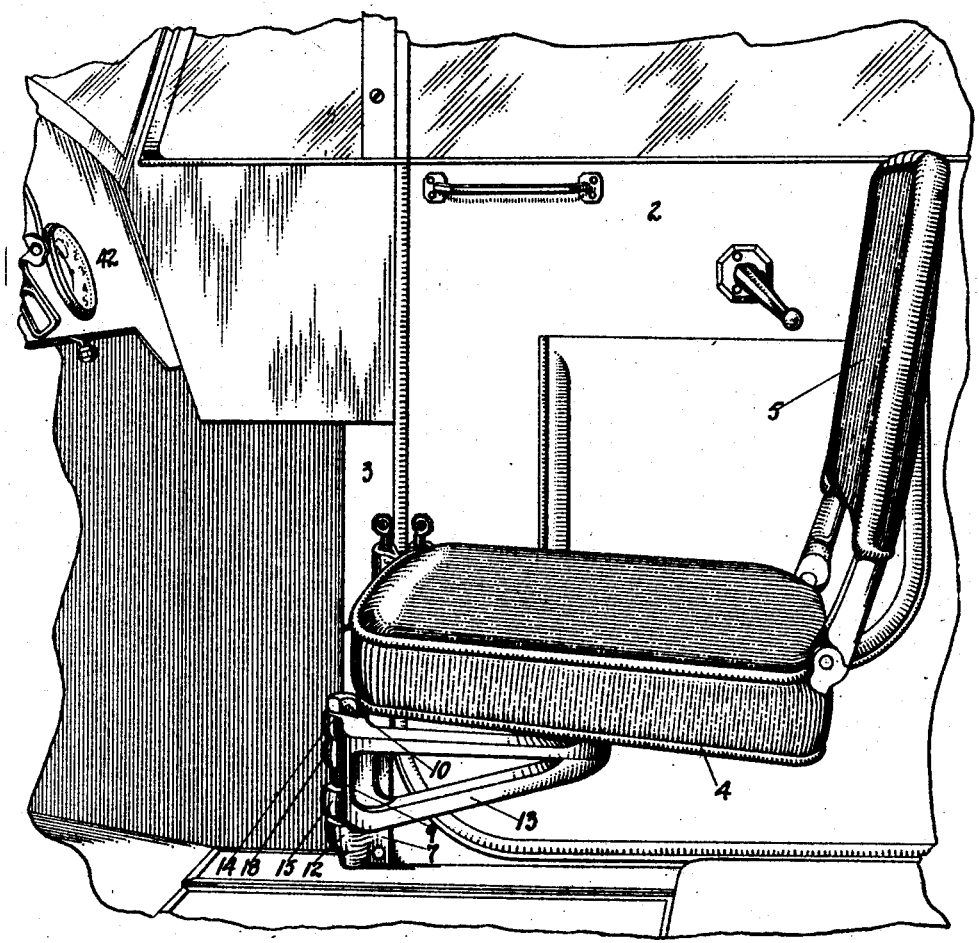
Fig. I
Fig. II
INVENTOR.
George E. Grimm
BY
ATTORNEYS.

Jan. 27, 1925.  
G. E. GRIMM  
SEAT STRUCTURE  
Filed Sept. 7, 1920
1,524,128
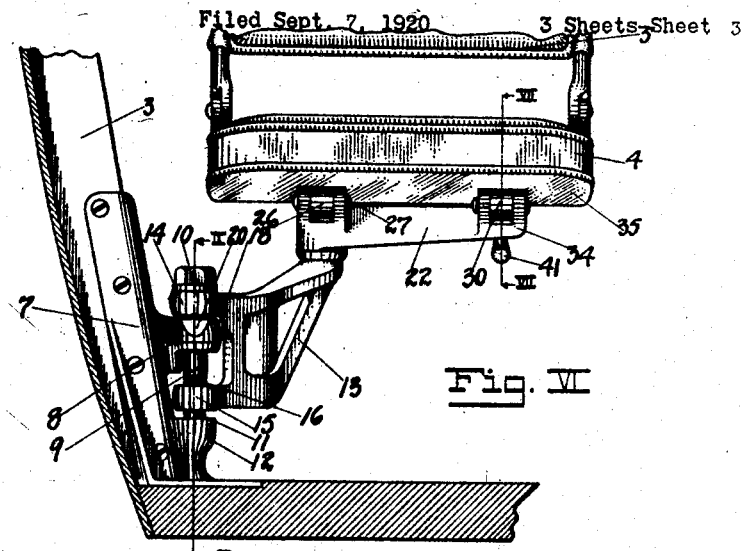
Fig. VI
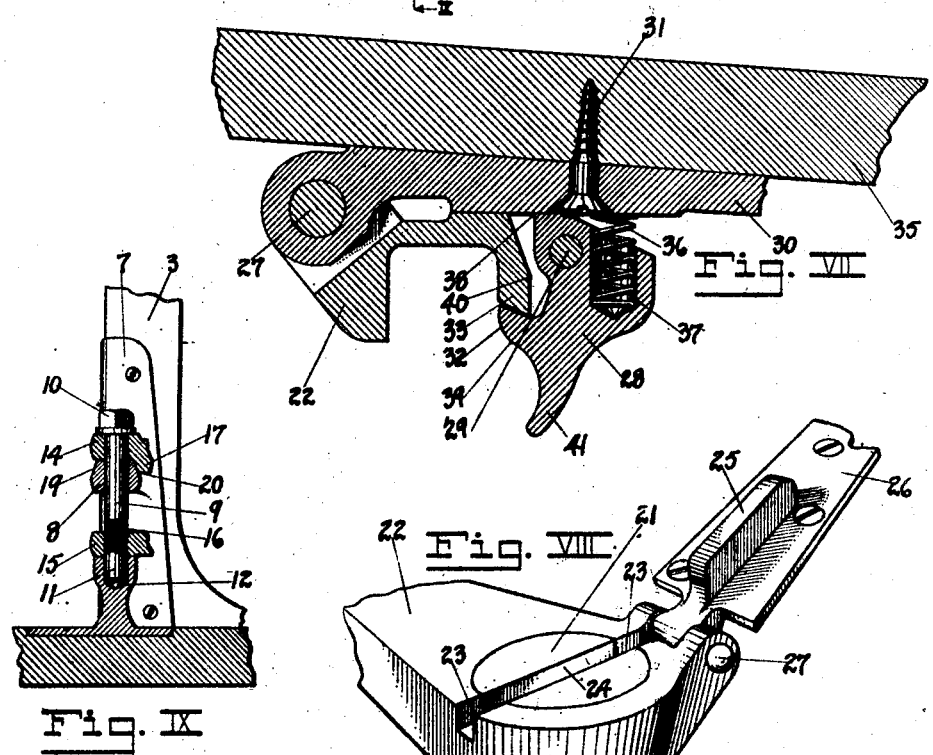
Fig. VII
Fig. IX
Fig. VIII
INVENTOR.  
George E. Grimm  
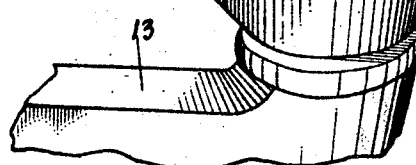  
ATTORNEYS.

Patented Jan. 27, 1925.

1,524,128

UNITED STATES PATENT OFFICE.

GEORGE E. GRIMM, OF TOLEDO, OHIO, ASSIGNOR TO THE WILLYS-OVERLAND COMPANY, OF TOLEDO, OHIO, A CORPORATION OF OHIO.

SEAT STRUCTURE.

Application filed September 7, 1920. Serial No. 408,587.

*To all whom it may concern:*

Be it known that I, GEORGE E. GRIMM, residing at Toledo, in the county of Lucas and State of Ohio, have invented certain new and useful Improvements in Seat Structures, of which I declare the following to be a full, clear, and exact description.

My invention relates to improvements in seat structures, and is particularly directed to seat structures for vehicles, such as automobiles and the like. An object of the invention is to provide a new and improved seat that may be placed in a number of positions.

Another object of the invention is to provide a new and improved seat structure that may be locked in numerous positions.

Another object of the invention is to provide a new and improved seat structure that may be folded up in locking position when not in use.

Another object of the invention is to provide a new and improved seat that may have either a forward or rearward seating position.

Another object of the invention is to provide a new and improved seat structure in which the arm carrying the seat may be locked in numerous positions.

Another object of the invention is to provide a seat structure in which an oscillating arm carrying the seat may be locked to the seat.

Another object is to provide novel means for automatically locking the seat structure either in operative or inoperative position.

Another object of the invention is to provide a new and improved locking means for folding seats wherein the seat and arm carrying the seat may be locked in a predetermined position.

Still another object of the invention is to provide a new and improved locking means for a folding seat wherein the seat may be locked on an arm supporting the seat when the arm is locked in a predetermined position.

Further objects of the invention relate to economies of manufacture and details of construction, as will hereinafter appear from the description to follow. The objects of the invention are accomplished in one instance by the devices and means described in the following specification, but it is evident that the same may be varied without departing from the scope of the invention as pointed out in the appended claims. The structure constituting an embodiment of the invention which may be the preferred is illustrated in the accompanying drawings forming a part of the specification in which:

Figure I is a perspective view of a folding coupé seat locked in a forward seating position in the coupé.

Figure II is a plan view of the seating arrangement of a coupé with the folding seat locked in a forward position.

Figure III is a perspective of my seat folded and locked in an inoperative position.

Figure IV is a plan view of the seating arrangement of a coupé with my folding seat locked in inoperative position.

Figure V is a similar plan view showing my folding seat in a rearward seating position.

Figure VI is a perspective view of the supporting means for carrying the seat.

Figure VII is a vertical section along the line VII—VII of Figure VI showing a locking device for the seat.

Figure VIII is a fragmentary view in perspective showing the device for holding my folding seat in a predetermined position.

Figure IX is a vertical section of the supporting bracket of the seat along the line IX—IX of Figure VI.

Like reference characters refer to similar parts throughout the several views of the drawings.

In the drawings, 1 designates the coupé body, 2 a door of the coupé, 3 a door post, and 4 a folding seat. The back 5 pivoted on the seat 4 may be folded downwardly and lie snugly against the seat. Firmly secured to the door post is a bracket 7 having a perforated lug 8 projecting outwardly from the bracket; and extending downwardly through the perforated lug is a pin or pintle 9 having a head 10, the lower end 11 of the pin resting in a socket 12 formed in the bracket 7. From a swinging pedestal 13 project perforated lugs 14 and 15, the latter being internally threaded to engage the threaded portion 16 of the pin 9. The lug 14 revolving with the pin has a cam-like member 17 depending therefrom which engages a rounded portion 18 and two flat portions 19 and 20 on the lug 8. When the cam 17 rides over the flat portions, the pedestal 13 is locked in position, and when it engages the rounded portion 18, the pedestal is elevated and will revolve freely through a small arc of a circle.

On the free end of the pedestal 13 is formed a pin 21 upon which is revolubly mounted a radial arm 22, a slotted portion 23 of which will align with a slot 24 on the pedestal so that a lug or keeper 25 on a plate 26 which is fixed to the bottom of the seat 4 and pivoted at 27 to the arm 22 will engage the slot formed by the alignment of the two slots in the radial arm 22 and the pin 21 on the end of the arm 13. When the lug 25 rests in the aligned slots 23 and 24, a latch 28, Figure VII, pivoted at 29 on a plate 30, which is secured to the bottom 35 of the seat by screws 31, locks the seat in position when a catch 32 on the latch rides over a keeper 33 on the free end 34 of the radial arm 22 to which the plate 30 is pivoted. A spring 36 placed in a recess 37 of the latch engages the plate 30 and holds the latch in position. A shoulder 38 on the latch 28, co-acting with the plate 30 prevents the spring 36 from giving the latch a too forward position in order that the catch 32 will readily engage the keeper 33. A rounded portion 39 on the catch 32 will ride on the flat side 40 of the keeper 33 when the seat 4 is lowered in locking position.

The operation of my device is as follows:

Seat 4 in Figure I is now locked in a forward seating position, the cam 17 resting on the flat side 20 of the lug 8, and the latch 28, Figure VII, having its catch 32 engaging the keeper 33. When it is desired to swing the seat around to a rearward seating position, the catch 32 is removed from engagement with the keeper 33 by the finger piece 41, and the seat 4 is tilted backward until the lug 25 is free of the aligned slots 23 and 24. The seat is then swung around on its swivel 21 until it faces the opposite direction for a rearward seating position. When the slots 23 and 24 align, the lug 25 will drop into place in the aligned slots, and the rounded portion 39 of the latch will ride over the flat portion 40 of the keeper until the catch 36 slips below the keeper 33, locking the seat in position as shown in Figure VII.

The seat may be folded and placed in an inoperative position against the side of the car body (Figures III and IV) when not in use, so that more space may be enjoyed in the coupé, as will be especially noted in Figure IV. To place the seat in this position, the back being folded down upon the seat 4, the cam 17 on the pedestal 13 is forced from its locking position with the flat portion 20 on the lug 8 of the bracket 7 by a short pull on the seat, thus slightly raising the pedestal 13, and the cam will ride on the rounded portion 18 of the lug 8, placing the seat at right angles to the former position. The catch 32, Figure VII, is removed from the keeper 33 by operating the finger piece 41, and the seat is tilted to a vertical position to release the lug 25 from the aligned slots 23 and 24. The radial arm 22 is revolved on its pivot 21, carrying the seat with it to the right until the arm is in alignment with the pedestal 13 and the whole structure is then forced against the side of the coupé, the cam 17 dropping into locking position with the flat side 19 of the lug 8. The seat structure is now folded away in inoperative position as shown in Figure III.

The seat may be placed in a forward seating position by sharply withdrawing the seat away from the side of the coupé. The cam 17 will be released from the flat side 19 of the lug 8 and ride on the rounded portion 18 until it slips into locked position with the other flat side 20 of the lug. The radial arm 22 and the seat are turned anticlockwise on the pin 21 until the slots 23 and 24 are in alignment. The rear end of the seat being in elevated position, is then lowered, dropping the lug 25 into the aligned slots 23 and 24 when the catch 32 will snap over the keeper 33, locking the seat in position.

While I have shown and described my invention in more or less detail and as being embodied in certain precise forms, I do not desire or intend it to be limited thereto, as on the contrary, my invention contemplates broadly all proper changes, as well as the admission of the immaterial elements and the substitution of equivalents as circumstances may suggest or necessity render expedient.

What I claim as new and desire to secure by Letters Patent is:

1. A folding seat for automobiles comprising in combination a bracket, a pedestal revolubly mounted on said bracket, means on said bracket, and means also on the pedestal, the said means co-operating with each other to lock the pedestal in a predetermined position, an arm revolubly mounted on the pedestal, a seat pivoted on the arm, and locking means on the said arm and seat co-operating to lock the seat in a predetermined position.

2. A folding seat for automobiles comprising in combination, a pedestal having a pin on its free end, an arm revolubly mounted on the pin, the said pin and arm having slots aligning at a predetermined position of the pedestal and arm, a seat pivoted on the arm and having a lug engaging the aligned slots, and means for locking the lug in the slots.

3. A folding seat for automobiles comprising in combination, a pedestal having a pin on its free end, an arm revolubly mounted on the pin, a seat mounted on the arm, means adapted to act when the arm and pedestal assume a certain predetermined relative position to lock the same in that position, and means to prevent the accidental displacement of said locking means.

4. In combination, a pedestal, a seat support horizontally rotatable thereon, a seat hinged to said support, means for locking said support to said pedestal in certain positions one hundred and eighty degrees apart, said means including alignable slots in said pedestal and support, a lug depending from said seat adapted to fit into said slots, and automatically acting means for locking said seat in lowered position.

5. In combination, a pedestal, a seat support horizontally rotatable thereon, a seat hinged to said support, means for locking said support to said pedestal in certain positions one hundred and eighty degrees apart, said means including alignable slots in said pedestal and support, a lug depending from said seat adapted to fit into said slots, and means actuated by movement of said seat to a lowered postion for locking the same.

6. In a folding seat for automobiles, the combination of a bracket having a perforated lug projecting outwardly therefrom, the said lug having two flat portions, a pedestal mounted on the bracket and provided with a projection adapted to engage the flat portions on the lug to lock the pedestal on the bracket.

7. In a folding seat for automobiles, the combination of a bracket having a perforated lug projecting outwardly therefrom, the said lug having a cam portion separating the two flat portions, a swinging pedestal mounted on the bracket and provided with a projection adapted to engage the flat portions on the lug to lock the pedestal on the bracket and the cam portion when the pedestal is swung.

8. In a folding seat for automobiles, the combination of a bracket having a perforated lug projecting outwardly therefrom, the said lug having two flat portions, a swinging pedestal mounted on the bracket and provided with a projection adapted to engage the flat portions on the lug to lock the pedestal on the bracket, and a cam portion located between the two flat portions on the lug and adapted to disengage the projection from its locating position with the flat portions when the pedestal is swung.

9. In a folding seat for automobiles, the combination of a bracket including a perforated lug and a socket, a pintle mounted in said lug and socket and having a threaded portion, and a pedestal including perforated lugs mounted on said pintle, one of said lugs being internally threaded to engage the threaded portion of the pintle.

10. In a folding seat for automobiles, the combination of a bracket including a perforated lug and a socket, a pintel mounted in said lug and socket and having a threaded portion, a pedestal including perforated lugs mounted on said pintle, one of said lugs being internally threaded to engage the threaded portion of the pintle, and means for locking the pedestal on the bracket.

11. In a folding seat for automobiles, the combination of a bracket including a perforated lug and a socket, a pintle mounted in said lug and socket, and having a threaded portion, a pedestal including perforated lugs mounted on said pintle, one of said lugs being internally threaded to receive the threaded portion of the pintle, means for locking the pedestal on the bracket and means for locking the seat in position on the pedestal.

12. A folding seat comprising in conbination a supporting arm horizontally disposed, a seat hinged to said arm at a point approximately midway between the front and rear portions of said seat, and a device controlled by the movement of the seat itself for automatically locking said seat in a horizontal position when the same is moved thereto from a vertical position.

13. A seat for automobiles comprising in combination a pedestal mounted to swing about a vertical axis, an arm mounted to swing upon the pedestal about a vertical axis, a seat mounted to swing upon the arm about a horizontal axis, a back upon the seat adapted to swing to substantially parallel relation with respect thereto, means on the seat adapted to engage the pedestal to lock the arm thereon, and separate means adapted to lock the seat upon the arm.

14. A seat for automobiles comprising in combination a support, a pedestal mounted to swing upon the support about a vertical axis, an arm mounted to swing upon the pedestal about a vertical axis, a seat mounted to swing upon the arm about a horizontal axis, means for locking the arm upon the pedestal, and independent means upon the seat for locking it upon the arm.

15. A seat for automobiles comprising in combination a pedestal mounted to swing about a vertical axis, an arm having one end pivoted to swing upon the free end of the pedestal about a vertical axis, a seat, a hinge connecting the seat with the arm, means on the hinge adapted to co-operate with the pedestal to prevent turning of the arm, and means for locking the seat upon the arm.

16. A seat for automobiles comprising in combination, a support, a pedestal mounted to swing upon the support about a vertical axis, an arm mounted to swing upon the pedestal about a vertical axis, a seat connected with the arm by a pair of hinged members, means on one of the hinged members co-operating with the pedestal to lock the arm thereon, and means on the other hinge member co-operating with the arm to lock the seat thereon.

In testimony whereof I affix my signature.

GEORGE E. GRIMM.